US012567974B2

(12) United States Patent
Webster et al.

(10) Patent No.: US 12,567,974 B2
(45) Date of Patent: Mar. 3, 2026

(54) METHOD, USER DEVICE, VERIFIER DEVICE, SERVER AND SYSTEM FOR AUTHENTICATING USER DATA WHILE PRESERVING USER PRIVACY

(71) Applicant: THALES DIS FRANCE SAS, Meudon (FR)

(72) Inventors: Michael Webster, Vantaa (FI); Gérald Maunier, Sanary sur Mer (FR); Kamil Parizek, Prague-Kunratice (CZ); Mourad Faher, Marly le Roi (FR)

(73) Assignee: THALES DIS FRANCE SAS, Meudon (FR)

( * ) Notice: Subject to any disclaimer, the term of this patent is extended or adjusted under 35 U.S.C. 154(b) by 258 days.

(21) Appl. No.: 18/014,794

(22) PCT Filed: Jul. 7, 2021

(86) PCT No.: PCT/EP2021/068796
§ 371 (c)(1),
(2) Date: Jan. 6, 2023

(87) PCT Pub. No.: WO2022/008585
PCT Pub. Date: Jan. 13, 2022

(65) Prior Publication Data
US 2023/0318847 A1 Oct. 5, 2023

(30) Foreign Application Priority Data
Jul. 9, 2020 (EP) ..................................... 20315347

(51) Int. Cl.
*H04L 9/08* (2006.01)
*H04L 9/32* (2006.01)

(52) U.S. Cl.
CPC .......... *H04L 9/3247* (2013.01); *H04L 9/0819* (2013.01); *H04L 9/0869* (2013.01); *H04L 9/3231* (2013.01)

(58) Field of Classification Search
CPC ... H04L 9/3247; H04L 9/0819; H04L 9/0869; H04L 9/3231; H04L 2209/08; H04L 63/08; G06F 21/31; H04W 12/06
(Continued)

(56) References Cited

U.S. PATENT DOCUMENTS 9,813,245 B2 * 11/2017 Le Saint ................. H04L 9/321
10,630,467 B1 * 4/2020 Gilbert .................. H04L 9/0827
(Continued)

FOREIGN PATENT DOCUMENTS

EP 3182315 A1 6/2017
WO WO-2008053279 A1 * 5/2008 ............. G06F 21/33
WO 2017160660 A2 9/2017

OTHER PUBLICATIONS

International Search Report (PCT/ISA/210) and Written Opinion (PCT/ISA/237) mailed on Oct. 1, 2021, by the European Patent Office as the International Searching Authority for current International Application No. PCT/EP2021/068796—[22 pages].

Primary Examiner — Taghi T Arani
Assistant Examiner — Pegah Barzegar

(57) ABSTRACT

A method comprises:
  receiving, by a user device, from a verifier device, a request for user data;
  retrieving a first cryptogram and a decryption key;
  sending and, to a server, the first cryptogram;
  retrieving a random and a second cryptogram generated using reference user authentication data concatenated with the random;
  sending, to the verifier device, the second cryptogram and the random;
(Continued)

storing the reference random;

sending, to the user device, the second cryptogram;

decrypting the second cryptogram using the decryption key;

extracting the reference user authentication data and the random;

providing, the user device, with user authentication data;

verifying that it matches the reference user authentication data;

providing, the verifier device, with the random;

verifying that it matches the reference random; and authenticating the user data.

11 Claims, 1 Drawing Sheet

(58) Field of Classification Search
USPC ........................................................ 713/176
See application file for complete search history.

(56) References Cited

U.S. PATENT DOCUMENTS

| | | | | |
|---|---|---|---|---|
| 10,673,632 | B2 * | 6/2020 | Lu | H04L 9/3239 |
| 11,799,656 | B2 * | 10/2023 | Liu | H04L 9/30 |
| 11,831,780 | B2 * | 11/2023 | Badrinarayanan | H04L 9/0866 |
| 2003/0041265 | A1 * | 2/2003 | Lagimonier | H04W 12/121 |
| | | | | 726/4 |
| 2013/0132283 | A1 * | 5/2013 | Hayhow | G06Q 20/1085 |
| | | | | 705/67 |
| 2015/0082399 | A1 * | 3/2015 | Wu | H04L 63/0838 |
| | | | | 726/10 |
| 2016/0019533 | A1 * | 1/2016 | Wu | G06Q 20/20 |
| | | | | 705/67 |
| 2017/0272253 | A1 * | 9/2017 | Lavender | H04L 63/12 |
| 2018/0302224 | A1 * | 10/2018 | Wilson | H04W 12/068 |
| 2018/0359092 | A1 * | 12/2018 | Lu | H04L 9/3239 |
| 2019/0057199 | A1 * | 2/2019 | Hutchinson | H04L 63/0853 |
| 2019/0266603 | A1 * | 8/2019 | Desjardins | G06Q 20/3829 |
| 2020/0169406 | A1 * | 5/2020 | Liu | H04L 9/30 |
| 2022/0165404 | A1 * | 5/2022 | Vivek | G16H 40/67 |
| 2023/0042508 | A1 * | 2/2023 | Agarwal | H04L 67/1097 |
| 2023/0065364 | A1 * | 3/2023 | Aichinger | H04L 67/141 |
| 2023/0318847 | A1 * | 10/2023 | Webster | H04W 12/06 |
| | | | | 713/176 |
| 2023/0337000 | A1 * | 10/2023 | Schnabel | H04W 12/63 |
| 2024/0028695 | A1 * | 1/2024 | Chen | G06F 3/04847 |

* cited by examiner

METHOD, USER DEVICE, VERIFIER DEVICE, SERVER AND SYSTEM FOR AUTHENTICATING USER DATA WHILE PRESERVING USER PRIVACY

FIELD

The invention relates generally to a method for authenticating user data while preserving user privacy.

Furthermore, the invention also pertains to a user device for authenticating user data while preserving user privacy.

The user device includes a computer type device, like e.g., a mobile (tele)phone. The user device may include a Secure Element (or SE) that is incorporated within or coupled to the user device, as an SE host device.

Within the present description, an SE is a smart object that includes a chip(s) that protect(s), as a tamper resistant component(s), access to stored and/or processed data and that is(are) intended to communicate data with an external device(s), like e.g., an SE host device, such as a mobile phone or a Personal Computer (or PC).

Moreover, the invention also relates to a verifier device for authenticating user data while preserving user privacy.

The invention concerns a server for authenticating user data while preserving user privacy as well.

The invention also pertains to a system for authenticating user data while preserving user privacy. The system includes a user device, a verifier device and one or several servers.

BACKGROUND

As described in the ISO/IEC CD2 18013-5, a mobile Driver's License (or mDL) application supported by a mobile phone allows a policeman equipped with a tablet to check a driver's license of a user of the mobile phone.

However, a user portrait is displayed on the tablet to verify the validity of the user driver's license. At least the user portrait, as personal user data, is disclosed to the tablet, as a verifier device, and therefore violating the user privacy.

US 2018/0302224 A1 describes a solution that allows authenticating e.g., a user age, involves a verifier to verify that e.g., a user portrait with authentication data, as a proof of the user age, allows authenticating the user age without being disclosed to the verifier.

There is a need of an alternative solution that allows authenticating user data while preserving user privacy, i.e. without disclosing any personal user data.

SUMMARY

The invention proposes a solution for satisfying the just herein above specified need by providing a method for authenticating user data while preserving user privacy.

According to the invention, the method comprises:

a) receiving, by a user device, from a verifier device, a request for getting the user data;

b) retrieving, by the user device, a predetermined first cryptogram and a predetermined decryption key;

c) sending, from the user device to the verifier device, the first cryptogram;

d) sending, from the verifier device to a server, the first cryptogram;

e) retrieving, by the server, based on the first cryptogram, a predetermined second cryptogram and a pre-generated random, the second cryptogram being generated using a predetermined encryption key and predetermined reference user authentication data concatenated with the random;

f) sending, from the server to the verifier device, the second cryptogram and the random;

g) storing, by the verifier device, at least temporarily, the random, as a reference random;

h) sending, from the verifier device to the user device, the second cryptogram;

i) decrypting, by or through the user device, the second cryptogram using the decryption key;

j) extracting, by or through the user device, the reference user authentication data and the random;

k) providing, by the user, the user device, with user authentication data;

l) verifying, by the user device, whether the provided user authentication data does or does not match the reference user authentication data;

m) providing, only if the provided user authentication data matches the reference user authentication data, by the user device, the verifier device or a verifier, with the random;

n) verifying, by the verifier device or the verifier, whether the provided random does or does not match the reference random; and o) authenticating, only if the provided random matches the reference random, by the verifier device or the verifier, the user data.

The principle of the invention consists in requesting, from a verifier device, a user device, to get data relating to a user of the user device. Then, the user device gets a predefined first cipher or cryptogram and a predefined decryption key. The user device transmits the first cryptogram to the verifier device. The verifier device then forwards the first cryptogram to a server. The server uses the first cryptogram to identify an associated predetermined second cryptogram and an associated random. The second cryptogram has been previously computer using a predefined encryption key and predefined reference user authentication data concatenated with the random. The server transmits, to the verifier device, the identified second cryptogram along with the identified random. The verifier device registers at least temporarily the received random. The verifier device then transmits, to the user device, the received second cryptogram. The user device deciphers or decrypts the received second cryptogram using the decryption key. The user device gets out of the decrypted second cryptogram the reference user authentication data and the random that have been both used to compute the second cryptogram. The user submits to or through the user device user authentication data. Then, the user device (or a cooperating entity that is communicatively connected or coupled to the user device) checks whether the submitted user authentication data matches (or not) the reference user authentication data. Only in the affirmative, the user device provides the verifier or the verifier device with the random. The verifier or the verifier device then checks whether the provided random matches (or not) the registered random. Only in the positive case, the verifier or the verifier device authenticates successfully the user data.

It is to be noted that the user data includes a user information piece(s), such as a user age, a user document(s), such as a driver's license, and/or user biometric data.

The verifier or the verifier device gets the registered or expected random only if the user and the user device are both genuine, i.e. the user device is able to decrypt the cryptogram and authenticate submitted user authentication data.

The invention solution allows binding data and its genuine user (or holder) and submitted user authentication data and the user device without disclosing any personal user data to the verifier or the verifier device side, i.e. the verifier device or a locally cooperating entity, such as an SE.

The first cryptogram that the user device sends initially to the verifier device allows an association, at the server side, with a previously generated random that has been used to generate the second cryptogram.

It is noteworthy that the server does not need to know the usage for which the first cryptogram is received from the verifier device thus preserving user privacy.

The second cryptogram to be received, by the user device, from the verifier device, plays a role of a correlation with the associated random that is to be provided by the user device to the verifier device or a verifier and that is to be checked by the verifier device or the verifier.

The second cryptogram is therefore used as a strong proof of binding, on one hand, data and its genuine user or holder and, on another hand, the user device and its genuine holder.

It is to be noted that the verifier device used for verifying a random only stores (or lets a locally cooperating entity, such as an SE, store), at least in a temporary manner, a reference random to be issued by the server. The memory footprint is therefore limited, minimum and efficient at the verifier device side.

The invention solution is simple at a verifier device side, since the verifier device (or a locally cooperating entity, such as an SE) has to register merely a reference random to be issued from a server.

The verifier device or the verifier does not need to know neither any user data nor any reference user data nor any cryptographic key to authenticate user data since the verifier device processes only two cryptograms and a random associated with the second cryptogram and the verifier device or the verifier only compares a random provided by the user device with the reference random provided by the verifier device.

The cryptograms and the random do not allow the verifier device or the verifier to link any of them to any particular user without involving a user device that authenticates the concerned user.

The invention verifier device keeps user privacy since the verifier device (or any locally cooperating entity) does not need to access any personal user data.

Contrary to the aforementioned second prior art solution, the verifier device does not need to access user data, such as a user portrait or a user biometric feature(s), since the verifier device processes only two cryptograms and a random. The invention verifier device does not need to use any secure means, like e.g., an SE, to process securely any personal user data. The invention verifier device is simple, easy to implement and secure.

The user device has to carry out an on-the-fly decryption of a second cryptogram received from the verifier device, as an original requester, and a delivery, to the requester or its holder, as a verifier, of a random that results from the second cryptogram decryption.

The invention solution is simple and efficient at the user device side, as the user device or a locally cooperating entity, such as an SE, registers only a decryption key and a first cryptogram, decrypts the second cryptogram and delivers a random resulting from the second cryptogram decryption.

The invention solution is secure at the user device side, as the user device or a locally cooperating entity registers a decryption key and a first cryptogram and decrypts a second cryptogram to be received from an original requester and, only after a successful user authentication, provides the verifier device or its holder with a corresponding resulting random.

The invention solution is also secure at the user device side, as the user device keeps secret the decryption key by not needing to transmit any (cryptographic) key, be it either a symmetric or asymmetric key, to the verifier device or its holder, as verifier.

It is noticeable that the decryption key may include either a key shared with another entity, such as the server or another entity connected hereto, or a private key relating to the user device.

The invention solution is secure at the verifier device side as well, since the verifier device (or a locally cooperating entity) and the verifier do not need to know neither any (cryptographic) key nor any personal user data and process at most two cryptograms and a random all being independent of the concerned user for the verifier device or its holder.

According to an additional aspect, the invention is a user device for authenticating user data while preserving user privacy.

According to the invention, the user device is configured to:

receive, from a verifier device, a request for getting the user data;

retrieve a predetermined first cryptogram and a predetermined decryption key;

send, to the verifier device, the first cryptogram;

receive, from the verifier device, a second cryptogram;

decrypt the second cryptogram using the decryption key;

extract reference user authentication data and a random;

be provided, by the user, with user authentication data;

verify whether the provided user authentication data does or does not match the reference user authentication data; and provide, only if the provided user authentication data matches the reference user authentication data, the verifier device or a verifier, with the random.

The user device includes a mobile phone, an SE and/or any computer device.

Instead of a standalone user device, the user device also includes a Terminal Equipment (or TE) including a terminal and one or several chips or the like. The terminal thus cooperates with a chip(s) that constitute(s) the above defined user device for authenticating user data while preserving user privacy.

According to a further aspect, the invention is a verifier device for authenticating user data while preserving user privacy.

According to the invention, the verifier device is configured to:

send, to a user device, a request for getting the user data;

receive, from the user device, a first cryptogram;

send, to a server, the first cryptogram;

receive, from the server, a second cryptogram and a random;

store, at least temporarily, the random, as a reference random; and send, to the user device, the second cryptogram.

The verifier device includes a mobile phone, a tablet, a portable PC, an SE and/or any other computer device.

According to still a further aspect, the invention is a server for authenticating user data while preserving user privacy.

According to the invention, the server is configured to:

receive, from a verifier device, a first cryptogram;

retrieve, based on the first cryptogram, a predetermined second cryptogram and a pre-generated random; and send, to the verifier device, the second cryptogram and the random.

According to still a further aspect, the invention is a system for authenticating user data while preserving user privacy. The system includes a user device, a verifier device and at least one server.

According to the invention, the system is adapted to carry out the steps of the aforementioned method.

BRIEF DESCRIPTION OF THE DRAWINGS

Additional features and advantages of the invention will be apparent from a detailed description of a preferred embodiment of the invention, given as an indicative and non-limitative example, in conjunction with the following drawings.

DETAILED DESCRIPTION

Herein under is considered a case in which the invention method for authenticating user data while preserving user privacy is implemented by, at a user side, a phone cooperating with an SE, as a user device, a standalone tablet, at a verifier device side, a verifier and a remote server. The verifier device does not need to cooperate locally, i.e. at the verifier device location, with another entity, like e.g., another SE, so as to carry out the functions that are described infra and that are carried out by the tablet.

According to another embodiment (not represented), the invention method for authenticating user data while preserving user privacy is implemented by a phone, as a standalone device. According to such an embodiment, the phone does not cooperate with any entity at the user device side, and is adapted to perform, in a less secure way than an SE, the functions that are described infra and that are carried out by the SE.

The invention does not impose any constraint as to a kind of the SE type.

The SE may include an incorporated chip, like e.g., an embedded Universal Integrated Circuit Card (or eUICC), an integrated Universal Integrated Circuit Card (or iUICC) or a Trusted Executed Environment (or TEE), in a user terminal, as an SE host device, or a chip that is communicatively coupled to the user terminal, as an SE host device, and included in a smart card (or another medium). The SE may be fixed to or removable from its host device. As removable SE, it may include a Subscriber Identity Module (or SIM) type card, a Secure Removable Module (or SRM), a smart dongle of the USB (acronym for "Universal Serial Bus")

type, a (micro-) Secure Digital (or SD) type card or a Multi-Media type Card (or MMC) or any format card to be coupled to a host device.

Naturally, the herein below described embodiment is only for exemplifying purposes and is not considered to reduce the scope of the invention.

Figure 1:
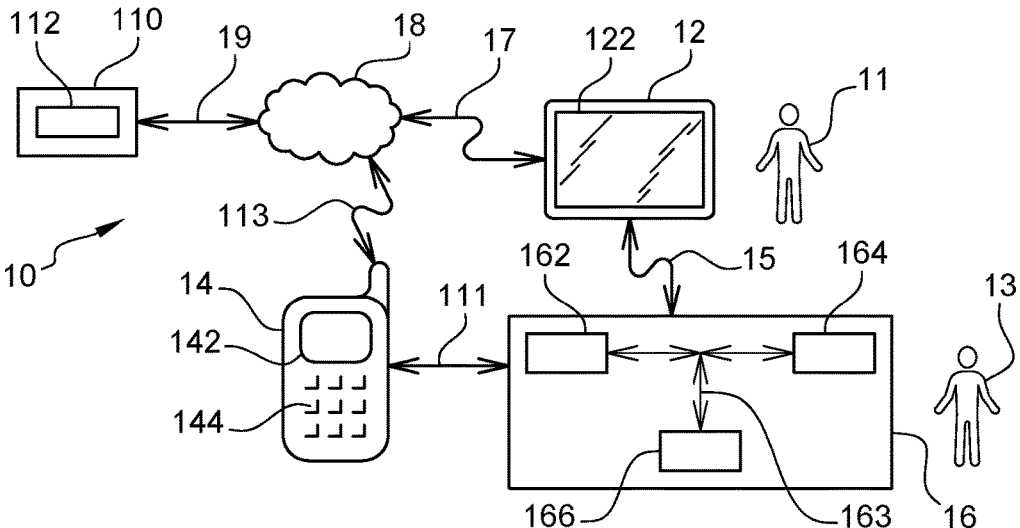
FIG. 1 is a simplified diagram of an embodiment of a system comprising a tablet, a phone with an SE, and a server, the SE being arranged to provide, through the tablet, the server, with a first cryptogram, the server being adapted to send to the tablet a second cryptogram and a reference random, the SE being arranged to decrypt the second cryptogram received from the tablet, authenticate the user and provide the tablet (or a verifier) with a random, the tablet (or the verifier) being adapted to check the provided random.

FIG. 1 shows schematically a system 10 for authenticating user data while preserving user privacy.

The system 10 includes e.g., a tablet 12, as a verifier device used by a first user 11, a phone 14 cooperating locally with an SE 16, as a user device used by a second user 13, and a server 110.

The second user 13 is preferably distinct from the first user 11, as a verifier.

Instead of a tablet, the verifier device includes a user terminal, a phone, a PC, a desktop computer, a laptop computer, a media-player, a game console, a netbook, a smart watch, a smart jewel (or jewelry), a handset, a Personal Digital Assistance (or PDA) and/or any mobile or non-mobile (electronic) device. The verifier device includes any other computing device including means for processing data, comprising or being connected to communication means for exchanging data with outside, and comprising or being connected to means for storing data.

The tablet 12 includes one or several (hardware) (micro) processors (one or several (micro)controllers and/or a Central Processing Unit (or CPU) (not represented), as data processing means, comprising and/or being connected to one or several memories (not represented), as data storing means, comprising or being connected to means, such as a Man Machine Interface (or MMI), for interfacing with the verifier 11, and comprising or being connected to Input/Output (or I/O) interfaces (not represented) that are internally all connected, through an internal bidirectional data bus (not represented).

The I/O interfaces include a wired and/or a wireless interface(s), to exchange, over a ContacT (or CT) and/or ContacT-Less (or CTL) type link(s) 15, with the phone 14, the SE 16 and/or (an)other SE(s) (not represented), as a local entity(ies) and a tablet 12 interlocutor(s) that is(are) situated at the tablet 12 location.

Within the present description, the adjective "CTL" denotes notably that the communication means communicates via one or several Short Range (or SR) type RadioFrequency (or RF) links.

The SR type RF link(s) may be related to any CTL technology that allows the tablet 12 to exchange locally data, through a CTL type link(s), with any local entity(ies).

The CTL type link(s) 15 may include a BluetooTH (or BTH), a Bluetooth Low Energy (or BLE), a Wi-Fi, a ZigBee, a Near Field Communication (or NFC) type link(s) and/or any other SR type RF communication technology link(s).

Alternatively, instead of a CTL type link(s), or additionally, the tablet 12 is connected, through a wire(s) or a cable(s) (not represented), as a CT link, to any local entity.

The I/O interfaces include a wired and/or a wireless interface(s), to exchange, over a CT and/or wireless link(s) 17, through one or several communication networks 18, with the remote server 110.

The communication network(s) 18 may include an Intranet, Internet and/or one or several mobile radio-communication networks.

The tablet 12 MMI may include a display screen(s) 122, a virtual and/or physical keyboard(s) (not represented), a loudspeaker(s) (not represented), a microphone (not represented) and/or a camera(s) (not represented).

The tablet 12 MMI allows notably the verifier 11, such as a policeman, to interact with the tablet 12.

The tablet 12 MMI may be used for getting data entered and/or provided by the verifier 11, such as verifier authentication data, like e.g., a Personal Identification Number (or PIN) and/or verifier biometric data (like e.g., a verifier fingerprint(s), a facial verifier print(s), a verifier iris print(s), a verifier palm print(s), a facial verifier image(s), a verifier picture(s) and/or any biometric verifier feature(s)).

The tablet 12 MMI may be used for providing data, such as a reference random. The provided data allows presenting, among others, orally and/or visually the data to the verifier 11.

The tablet memory(ies) may include one or several volatile memories and/or one or several non-volatile memories.

The tablet memory(ies) may store a first and/or a last name(s) relating to the verifier 11, as a first user IDentifier(s) (or ID), an International Mobile Equipment Identity (or IMEI), a Mobile Subscriber Integrated Services Digital Network number (or MSISDN), an Internet Protocol (or IP) address, an International Mobile Subscriber Identity (or IMSI), a Media Access Control (or MAC) address, an email address(es) and/or the like, as an ID(s).

The tablet memory(ies) may store data, such as an ID(s) relating to the tablet 12, that allows identifying uniquely and addressing the tablet 12. The tablet 12 ID(s) may include a unique ID1, such as a UUID1, a Uniform Resource Locator (or URL) 1, a Uniform Resource ID (or URI) 1 and/or other data that allows identifying uniquely and addressing the tablet 12.

The tablet memory(ies) may store data, such as an ID(s) relating to the server 110, that allows identifying uniquely and addressing the server 110.

The tablet 12 may be provided by the verifier 11 with the server 110 ID(s). The server 110 ID(s) may include a unique ID2, such as a UUID2, a URL2, a URI2, and/or other data that allows identifying uniquely and addressing the server 110.

The tablet memory(ies) stores an Operating System (or OS) and an invention application (or SoftWare (or SW)), i.e. a code or data that is executable by a or the tablet (micro) processor ((micro)controller or CPU).

The tablet 12, as an original requester, is configured to send, to a user device, such as the phone 14 or the SE 16, a request for authenticating user data, so as to launch a session of authentication of data relating to the user 13 of the user device.

The user data may include a user information piece(s), such as a user age, a user document(s), such as a driver's license, or user authentication data, such as a PIN and/or user biometric data. The user biometric data may include e.g., a user fingerprint(s), a user palm print(s), a facial user image(s), a user picture(s), a user iris print(s) and/or (an) other biometric user feature(s)).

The tablet 12 is arranged to receive, from or through the user device, a first cryptogram and to send, to the server 110, the first cryptogram.

The first cryptogram is used for launching, in an anonymous manner, a user data authentication (session). The tablet 12 is adapted to receive, from the server 110, a second cryptogram and a random.

The second cryptogram is used as a strong proof of binding, on one hand, data and its genuine user 13 or holder and, on another hand, the user device and its genuine holder.

The tablet 12 may be able to verify that the first cryptogram, the second cryptogram and/or the random has(have)

been previously signed by the server 110, as the original and genuine sender of the concerned cryptogram(s) and/or the random respectively.

One the tablet 12 has received the random from the server 110, the tablet 12 is preferably arranged to store, at least in a temporary manner, the random, as a reference random. The reference random is expected to be provided from the involved user device to the tablet 12 or its holder 11.

The tablet 12 is configured to send, to the user device, the second cryptogram that is received from the server 110.

According to a first (invention) embodiment, the tablet 12 is adapted to receive, from the user device, the random. The random to be received from the user device results from a second cryptogram decryption at the user device side.

According to the first embodiment, the tablet 12 is configured to verify whether the (lastly) received random is or is not valid, i.e. the random that has been received from the user device matches the random that has been received from the server 110.

If the lastly received random is not valid, then the tablet 12 fails to authenticate the concerned user data.

Otherwise, i.e. if the lastly received random is valid, the tablet 12 authenticates successfully the concerned user data.

Instead of a phone, the user device includes a user terminal, a PC, a laptop computer, a media-player, a game console, a netbook, a smart watch, a smart jewel (or jewelry), a handset, a PDA and/or any stationary or mobile (electronic) device. The user device includes any other computing device including means for processing data, comprising or being connected to communication means for exchanging data with outside, and comprising or being connected to means for storing data.

The phone 14 includes one or several (hardware) (micro) processors (one or several (micro)controllers and/or a CPU) (not represented), as data processing means, comprising and/or being connected to one or several memories (not represented), as data storing means, comprising or being connected to means, such as an MMI, for interfacing with the user 13 and possibly the verifier 11, and comprising or being connected to I/O interfaces (not represented) that are internally all connected, through an internal bidirectional data bus (not represented).

The I/O interfaces include a wired and/or a wireless interface(s), to exchange, over a CT and/or a CTL type link(s), with the tablet 12, the SE 16 and/or (an)other entity(ies) (not represented), as a local entity(ies) and a user device interlocutor(s).

The CTL type link(s) may include a BTH, a BLE, a Wi-Fi, a ZigBee, an NFC type link(s) and/or any other SR type RF communication technology link(s).

Alternatively, instead of a CTL type link(s), or additionally, the phone 14 is connected, through a wire(s) or a cable(s) (not represented), to the tablet 12, the SE 16 and/or (an)other entity(ies) (not represented), as a local entity(ies).

The phone 14 MMI may include a display screen(s) 142, a physical (and/or virtual) keyboard(s) 144, a loudspeaker(s) (not represented) and/or a camera(s) (not represented).

The phone 14 MMI may include one or several biometric sensors, so as to capture one or several user biometric features.

The phone 14 MMI allows the user 13 and/or the verifier 11 to interact with the phone 14.

The phone 14 MMI may be used for getting data entered and/or provided by the user 13, such as user authentication data. The user authentication data may include a user portrait, a PIN and/or user biometric data. The user biometric data includes e.g., a user fingerprint(s), a user palm print(s), a facial user image(s), a user picture(s), a user iris print(s) and/or (an)other biometric user feature(s)).

The phone 14 MMI may be used for providing user data, such as a driver's license and/or data, such as a random that results from a decryption of a second cryptogram to be provided from a local device side, such a tablet 12. The provided data allows presenting, among others, orally and/or visually, the concerned data notably to the verifier 11 and/or the user 13.

The phone memory(ies) may include one or several volatile memories and/or one or several non-volatile memories.

The phone memory(ies) may store a first and/or a last name(s) relating to the user 13, as a second user ID(s)), an IMEI, a MSISDN, an IP address, an IMSI, a MAC address, an email address(es) and/or the like.

The phone memory(ies) may store data, such as an ID(s) relating to the phone 14, that allows identifying uniquely and addressing the phone 14. The phone 14 ID(s) may include a unique ID3, such as a UUID3, a URL3, a URI3, and/or other data that allows identifying uniquely and addressing the phone 14.

The phone memory(ies) stores an OS.

The phone 14 is connected or coupled preferably, through a CT and/or a CTL type link(s) 111, to the SE 16. The SE 16 allows protecting access to data, such as a first cryptogram, a second cryptogram and a random resulting from a decryption of the second cryptogram, that is stored and/or processed by the SE 16.

The SE 16 includes a chip(s).

The (SE) chip(s) include(s) one or several (hardware) (micro)processors (and/or one or several (micro)controllers) 162, as data processing means, comprising and/or being connected to one or several memories 164, as data storing means, comprising or being connected to means, such as an MMI, for interfacing with the user 13, and comprising or being connected to I/O interfaces 166 that are internally all connected, through an internal bidirectional data bus 163.

The SE I/O interfaces 166 include a wired and/or a wireless interface(s), to exchange, over the CT and/or CTL type links, with the tablet 12, the phone 14 and/or any local entity(ies), as the SE 16 interlocutor(s) that is(are) situated at the SE 16 location.

The SE memory(ies) 164 store(s), in a secure manner, a predefined decryption key and a predetermined first cryptogram. The stored first cryptogram is to be received preferably from the server 110 side during a registration or enrolment phase.

The decryption key is, in a first scenario, a private key (or pk) relating to the SE 16, or, in a second scenario, a symmetric key (or sk) shared between the SE 16 and (an)other entity(ies) that may have contributed to generate or provide the decryption key.

The decryption key is associated with either, in the first scenario, the SE 16 or, in the second scenario, the SE 16 and (an)other entity(ies), like e.g., the server 110 and/or (an) other entity(ies), such as a Hardware Security Module (or HSM) (not represented), that cooperates with the server 110.

The decryption key is used for decrypting a second cryptogram to be received from a verifier device, like e.g. the tablet 12, during a user data authentication phase or session.

The SE memory(ies) 164 may store securely a signature generation key. The signature generation key may be either the pk or another key that is distinct from the pk and that is dedicated to sign data, such as the first cryptogram and/or the random to be sent to the verifier device, such as e.g., the tablet 12.

The SE memory(ies) 164 may store, in a secure manner, user data, such as reference user authentication data. The reference user authentication data may include a reference PIN and/or a reference user biometric data. The reference user authentication data allows authenticating the user 13. The reference user biometric data may include a reference facial user image(s), a reference user picture(s), a reference user fingerprint(s), a reference user palm print(s), a reference user iris print(s) and/or (an)other reference user biometric feature(s).

The SE memory(ies) 164 store(s) an OS.

The SE memory(ies) 164 store(s) preferably an invention application (or SW) that is executable by a or the SE (micro)processor (or (micro)controller), as SE data processing means.

The SE 16 may be configured to generate the decryption key, i.e. in the first scenario, the pk, or, in the second scenario, the sk.

In the first scenario, the SE 16 is preferably arranged to generate a key pair that includes the pk, as the decryption key and a corresponding Public Key (or PK), as the encryption key. The generated key pair, namely the pk and the PK, relates to the SE 16.

The SE 16 may be configured to generate a private key, as a signature generation key, that relates to the SE 16. The signature generation key allows signing data, such as a first cryptogram and a random to be both sent to the verifier device.

The SE 16 may be configured to generate a public key, as a signature verification key, that is associated with the signature generation key that also relates to the SE 16. The signature verification key allows an SE interlocutor(s), such as the tablet 12 and/or the server 110, to verify data that has been received from and signed by the SE 16.

The SE 16 is preferably arranged to send, preferably through a secure channel, such as a Transport Layer Security (or TLS), a mobile TLS or a HyperText Transfer Protocol Secure (or HTTPS) type channel, to the server 110, during the enrolment phase, a predefined encryption key. The encryption key is either, in the first scenario, the PK, as the key associated with the pk, or, in the second scenario, the sk. The secure channel allows preferably an SE 16 authentication, a server 110 authentication, an exchange integrity and/or an anti-replay protection.

The SE 16 is preferably arranged to receive, preferably through a secure channel, such as e.g., a TLS, a mobile TLS or an HTTPS type channel, from the server 110, during the enrolment phase, a predefined second cryptogram.

The SE 16 may be arranged to provide, in a secure manner, the server 110 with reference user authentication data, during a pre-enrolment phase.

The SE 16, as a user device, is configured to receive, from a verifier device, such as the tablet 12, a request for getting user data.

The SE 16 is arranged to retrieve a predetermined first cryptogram and a predefined decryption key.

The decryption key has been previously generated preferably at the SE 16 side.

A corresponding encryption key is either, in the first scenario, the PK, as a key associated with the pk, as the decryption key, or, in the second scenario, the sk. In the second scenario, the sk constitutes both the encryption key and the decryption key.

The encryption key may have been previously generated at the SE 16 side or at the server 110 side.

The SE 16 may be arranged to send the encryption key to the server 110 during the enrolment phase.

The SE 16 is configured to send, to the verifier device, the first cryptogram and receive, from the verifier device, a second cryptogram.

According to an essential invention feature, the SE 16 is adapted to decrypt the (received) second cryptogram using the (stored) decryption key.

The second cryptogram has been previously generated using, on one hand, an encryption key and, on another hand, predetermined reference user authentication data concatenated with a previously generated random.

The SE 16 is configured to extract reference user authentication data and a random. The reference user authentication data and the random result both from a decryption of the second random.

The SE 16 is arranged to be provided, by the user 13, with user authentication data, such as a self ie (a picture or photo of the user 13 taken by herself/himself), a PIN and/or biometric user data.

Further to the second cryptogram decryption, the SE 16 is adapted to verify whether the provided user authentication data does or does not match the reference user authentication data.

The SE 16 is adapted to provide the verifier device or the verifier 11 with the (resulting) random.

According to the first (invention) embodiment, the SE 16 is configured to send, only if the provided user authentication data matches the reference user authentication data, to the verifier device, the random.

According to a second embodiment, the SE 16 is adapted to present, only if the provided user authentication data matches the reference user authentication data, to the verifier 11, through e.g. the phone 14 MMI, the random.

The random provided by the SE 16 to the verifier device or the verifier results from the second cryptogram decryption.

The SE 16, as user device, exchanges preferably with the server 110 (or another server connected hereto) only during the enrolment phase, so as to configure data, at the server 110 side and at the user device side, for the concerned user account.

The server 110 is connected or coupled, through a CT and/or a CTL type link(s) 19, to the communication network(s) 18.

The server 110 is accessible through the communication network(s) 18, over a (bi-directional) wireless and/or wire links 17 and 113, from a set of user devices and a set of one or several verifier devices.

The server 110 is identified by an ID(s) relating to the server 110. The server 110 ID(s) may be stored at the user device side (e.g., in a phone 14 memory and/or a memory of an SE 16 communicatively coupled to the phone 14), and/or at the verifier side, (e.g., in a tablet 12 memory and/or a memory of an SE communicatively coupled to the tablet 12).

The server 110 may be operated by an authority, a Mobile Network Operator (or MNO), a Mobile Virtual Network Operator (or MVNO), a bank operator, a service provider or on its behalf.

The server 110 is hosted by a computer device including data processing means, like e.g., a CPU, a processor(s) and/or a controller(s) (not represented), and several I/O interfaces for exchanging data with outside.

The server 110 accesses, i.e. includes, is connected or coupled to, a server memory(ies) 112, as data storing means.

The server memory(ies) 112 may store a set of one or several IDs relating, each, to an authorized verifier device. The verifier device ID set is predefined. The verifier device ID set includes, for each associated verifier, one or several IDs relating to the concerned verifier device. Each verifier device ID allows identifying uniquely and accessing a corresponding verifier device.

A database includes data relating to a plurality of accounts relating to second users including the (second) user 13 whose personal data is separately and individually to be authenticated.

The database may be stored in the server memory(ies) 112. The database may be stored in a memory(ies) of (an)other server(s) communicatively connected to the server 110, a memory(ies) of a cloud communicatively connected to the server 110 and/or a blockchain.

The database comprises, for each (second) user account, a cipher or a second cryptogram in association with a corresponding associated random and other possible (and not mandatory) data.

As possible other data, it may include data relating to a corresponding associated encryption key, one or several IDs relating to the concerned user, one or several IDs relating to a corresponding user device(s), a first cryptogram, reference user authentication data and/or a public key relating to each user device. The public key relating to each user device may be used for verifying a digital signature issued by the concerned user device.

The server 110 or another cooperating entity, such as another server, that is communicatively connected to the server 110, as a random generation entity, is preferably configured to generate a random for each user account during the enrolment phase.

The server 110, or another cooperating entity, such as an HSM, that is communicatively connected to the server 110, as a second cryptogram generation entity, is preferably configured to generate a second cryptogram for each (second) user during the enrolment phase.

To generate the second cryptogram, the second cryptogram generation entity concatenates preferably (pre-registered) reference user authentication data and a (pre-generated) random and encrypts a (resulting) (data) concatenate using an encryption key.

Within the present description, a concatenate is a series or chain of different data elements, such as reference user authentication data and a random, with or without a separator between the different data elements.

The encryption key is, for a given second user account, in the first scenario, the PK or, in the second scenario, the sk.

Optionally, the server 110 generates a hash relating to the encryption key, so as to reduce a size relating to the encryption key. For instance, the encryption key has e.g., a size of 128 bits while the encryption key hash has a reduced size of e.g., 24 bits. The generated encryption key hash may be associated with the (generated) second cryptogram for each second user account within the database.

The (resulting) second cryptogram is a concatenate of encrypted reference user authentication data and an encrypted random.

The server 110, or another cooperating entity, such as an HSM, that is communicatively connected to the server 110, as a first cryptogram generation entity, is preferably configured to generate a first cryptogram for each (second) user during the enrolment phase.

To generate the first cryptogram, the first cryptogram generation entity may add a pre-generated random to the second cryptogram. The first cryptogram may further include a signature issued by the first cryptogram generation entity. The first cryptogram is used as a (digital) token.

The server memory(ies) 112 store(s) an OS and an invention application (or SW) that is executable by a or the server processor (or controller or CPU).

The server 110 plays preferably a role of an authority that is in charge of providing, during a user data authentication phase or session, a verifier device, such as e.g., the tablet 12, with a registered second cryptogram accompanied with an associated registered random.

The server 110 is configured to receive, from a verifier device, such as e.g., the tablet 12, a first cryptogram.

Such a first cryptogram may have been issued by the server 110 and/or originate from a (pre-registered) user device through a (pre-registered) verifier device.

Optionally, the server 110 is adapted to check whether the received first cryptogram does or does not satisfy one or several conditions. The condition(s) to be satisfied may include one or several elements of a group comprising:

if the received first cryptogram is accompanied with a corresponding valid signature originating from the server 110, as an original first cryptogram issuer;

if the received first cryptogram is accompanied with a corresponding valid signature originating from a user device, as a first cryptogram recorder;

if the received first cryptogram is accompanied with a corresponding valid signature originating from a verifier device, as an original user data verifier and a requester; and if the received first cryptogram matches with a first cryptogram included in the database.

The server 110 is adapted to retrieve, based on the (received) first cryptogram, a predefined second cryptogram and a (pre-generated) random.

The server 110 may be able to sign data, such as at least the random and possibly the second cryptogram prior to its/their sending to a verifier device.

The server 110 is arranged to send, to the verifier device, the second cryptogram accompanied with the (retrieved) random that may have been previously signed.

Figure 2:
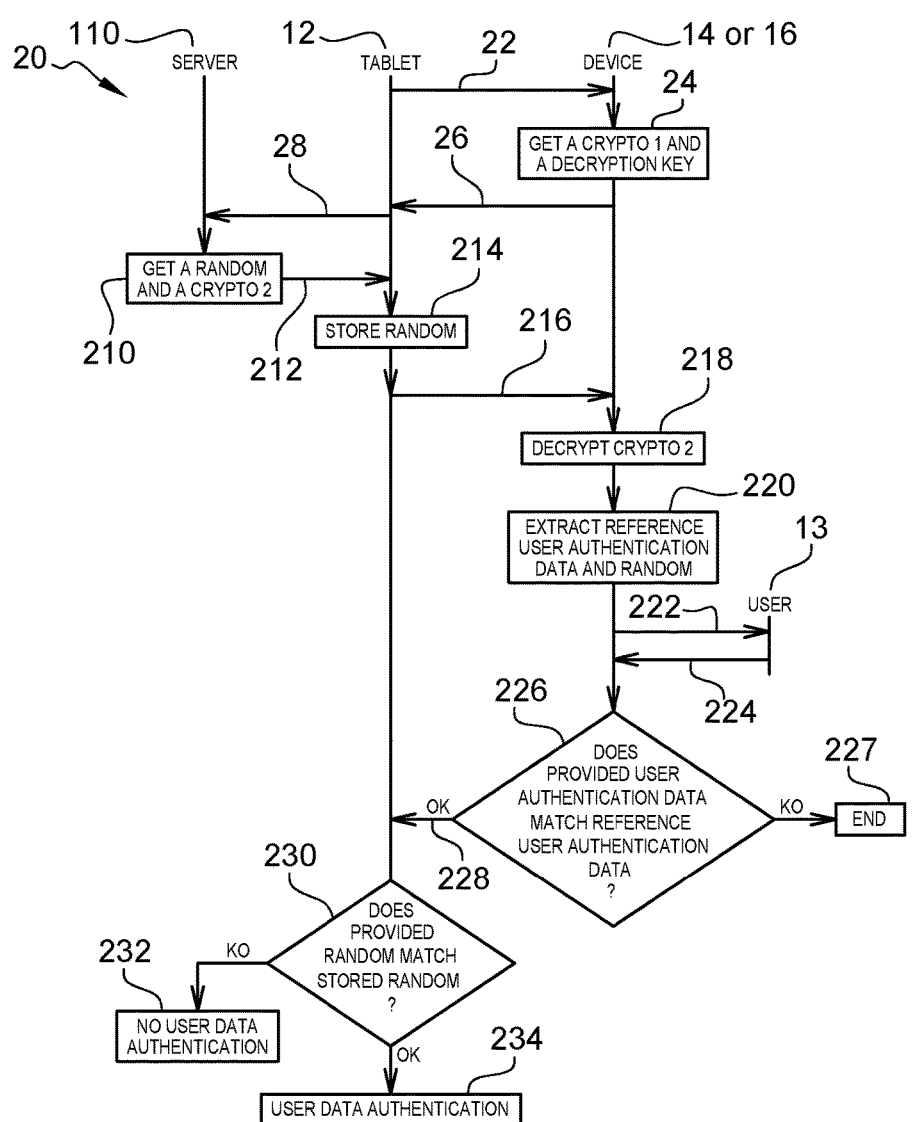
FIG. 2 is a message flow between the verifier, the tablet, the user, the SE and the server of FIG. 1, so that, once the SE has provided, when the user is authenticated, the tablet (or the verifier) with the random resulting from the second cryptogram decryption, the tablet (or the verifier) ensures that the provided random is the reference random, so that the tablet (or the verifier) authenticates the user data while preserving user privacy.

FIG. 2 depicts a first (method) embodiment through a message flow 20 that involves the verifier 11, the tablet 12, the user 13, the SE 16 and the server 110.

In the described example, it is assumed that the server 110 has stored a first cryptogram, a previously generated random in association with a predetermined associated second cryptogram. The random has been previously generated at the server 110 side. The second cryptogram has been previously generated by or through the server 110 using a pre-registered PK, as an encryption key, a predefined data encryption algorithm, like e.g. a Data Encryption Standard (or DES) or 3DES type algorithm, a predetermined user portrait, as reference user authentication data, concatenated with the random. The second cryptogram includes an encrypted user portrait, as encrypted reference user authentication data, concatenated with an encrypted random. The database registers the first and second cryptograms in association with the random used for generating the second cryptogram in its user account.

It is further assumed that, once configured, the SE 16 stores securely the first cryptogram and the (associated) decryption key.

According to another embodiment (not represented), the cryptogram includes, besides the encrypted reference user authentication data and the encrypted random, one or several encrypted user guiding instructions.

Optionally, the second cryptogram has been previously (i.e. prior to its sending to any entity(ies)) signed by the server 110. Thus, the SE 16, the tablet 12 and/or the server 110 is(are) able to verify (successfully) that the second cryptogram is signed by the server 110 side, as an original second cryptogram issuer.

It is further assumed that the user 13 has launched an execution of the invention application supported by the SE 16, as a user device.

Optionally, to unlock or authorize access to the stored first cryptogram and the stored decryption key, the SE 16 authenticates (successfully) (not represented) the user 13. To authenticate the user 13, the SE 16 requests the user 13 to provide user authentication data, such as a PIN, a biometric user feature(s) and/or user credentials, and compares the provided user authentication data to the reference user authentication data that is pre-registered in the SE 16. Only if the provided user authentication data matches the reference user authentication data, the SE 16 authenticates (successfully) the user 13.

The phone 14 may present, through the phone MMI, a driver's license, as user data and/or other user data.

In a preferred embodiment, the server 110 is the sole server involved at the server side during such a user data authentication phase or session.

Alternatively, i.e. instead of a single server, two or more servers are involved.

It is still assumed that the verifier 11 has launched, preferably through the tablet 12 MMI, an execution of the (invention) application supported by the tablet 12, as a verifier device.

Optionally, the tablet 12 authenticates (successfully) (not represented) the verifier 11. To authenticate the verifier 11, the tablet 12 requests the verifier 11 to provide verifier authentication data and compares the provided verifier authentication data to reference verifier authentication data that is pre-registered in the tablet 12 or an SE cooperating with the tablet 12. Only if the provided verifier authentication data matches the reference verifier authentication data, the tablet 12 authenticates the verifier 11.

The tablet 12 executes the supported application.

The tablet 12 sends 22, to the SE 16, a request for getting a driver's license, as user data.

The tablet 12 requests user data, so as to allow an holder of the tablet 12, as a verifier, to authenticate the concerned user 13 data and the concerned user 13.

To send such a user data request, the tablet 12 transmits, preferably through a BTH and/or (an)other CTL type link, as a first channel, to the SE 16, the user data request.

Once the SE 16 has received the user data request, the SE 16 retrieves 24 the (recorded or stored) first cryptogram and the (stored) decryption key.

Optionally, the SE 16 signs (not represented) the (retrieved) cryptogram.

The SE 16 then sends 26, to the tablet 12, the first cryptogram that may have been previously signed by the server 110 and/or the SE 16. Such a signed first cryptogram allows proving that the first cryptogram issuer is the server 110 and/or that the first cryptogram recorder is the SE 16 respectively.

After having possibly verified that the first cryptogram is signed by the server 110 and/or the SE 16, the tablet 12 may sign (not represented) the (received) first cryptogram, so as to prove to its addressee that the tablet 12 is the original user data verifier and the first cryptogram sender.

The tablet 12 may store the first cryptogram that is received from the SE 16.

The tablet 12 sends 28, preferably through an Over-The-Air (OTA), Over-The-Internet (or OTI) or Over-The-Cloud channel (not represented), as a second channel, to the server 110, the first cryptogram that may have been previously signed. The first cryptogram signature(s) allow(s) proving that the first cryptogram is sent by the server 110, as the original first cryptogram issuer, the SE 16, as the first cryptogram recorder, and/or the tablet 12, as the first cryptogram sender.

The second channel is preferably separate from the first channel.

Once the server 110 has, in a preferred manner, verified that the first cryptogram is signed by the server 110, the SE 16 and/or the tablet 12, the server 110 retrieves 210, based on the first cryptogram, a predefined second cryptogram and a (pre-generated) random. The retrieved random is the random that is associated with the second cryptogram within the database accessible from the server 110 for the account of the user 13. The second cryptogram has been generated using a predefined encryption key, e.g., a predefined user 13 portrait, as reference user authentication data, that is concatenated with the random.

Optionally, the server 110 signs (not represented) at least the random and possibly the second cryptogram. Such a random signature and such a possible second cryptogram signature allow both proving that the random sender and the second cryptogram sender are the server 110.

The server 110 sends 212, to the tablet 12, the random and the second cryptogram. At least the random may have been previously signed.

Once the tablet 12 has, in a preferred manner, verified that at least the random is signed by the server 110, the tablet 12 stores 214, at least in a temporary manner, the random. The stored random is a reference random to be matched.

Optionally, the tablet 12 signs (not represented) the second cryptogram.

The tablet 12 sends 216, to the SE 16, the second cryptogram that may have been previously signed by the server 110 and/or the tablet 12. The second cryptogram signature(s) allow(s) proving that the second cryptogram issuer is the server 110 and/or the second cryptogram sender is the tablet 12 respectively.

Once the SE 16 has, in a preferred manner, verified that the second cryptogram is signed by the server 110 and/or the tablet 12, the SE 16 decrypts 218 the second cryptogram using the (stored) decryption key.

After the SE 16 has decrypted the second cryptogram, the SE 16 gets the user portrait, as the reference user authentication data (in plain text, i.e. in an unciphered manner), that is concatenated with the random (in plain text).

Additionally to the encrypted reference user authentication data concatenated with the encrypted random, the second cryptogram may include, one or several encrypted user guiding instructions. After the SE 16 has decrypted the second cryptogram, the SE 16 gets additionally to the reference user authentication data that is concatenated with the random, one or several user guiding instructions (in plain text).

Once the SE 16 has decrypted the second cryptogram, the SE 16 extracts 220 the (resulting) reference user authentication data and the (resulting) random (in plain text).

Additionally to the extraction of the reference user authentication data and the random, the SE 16 may extract (not represented) one or several (resulting) user guiding instructions.

The SE 16 then provides 222 preferably, e.g., through the phone 14 MMI, the user 13 with a facial user picture request, as a user authentication data request.

Additionally to the user authentication data request, the SE may provide, e.g., through the phone MMI, the user 13 with one or several user guiding instructions. The user guiding instruction(s) include(s) one or several instructions for guiding the user to provide user authentication data, such as a facial user picture(s) taken from the left side, a facial user picture(s) taken from the right side and/or other biometric user feature(s). The user guiding instruction(s) is(are) used for guiding the user 13, so that the SE 16 authenticates properly the provided user authentication data.

The user 13 provides 224, e.g., after having taken a facial user picture(s), the SE 16 with the (taken) facial user picture(s), as user authentication data.

The SE 16 verifies 226 whether the provided facial user picture(s), as user authentication data, does or does not match the user portrait, as reference user authentication data.

If the provided user authentication data does not match the reference user authentication data, then the SE 16 does not authenticate the user. The SE 16 may then provide the tablet 12 or the verifier 11 with any data distinct from the extracted random and/or a user authentication failure message. The user data authentication session is thus terminated 227.

Otherwise, i.e. if the provided user authentication data matches the reference user authentication data, the SE 16 authenticates the user. Optionally, the SE 16 signs (not represented) the (extracted) random, so as to prove that the random sender is the SE 16. The SE 16 provides the tablet 12 or the verifier 11 with the (extracted) random.

According to the first embodiment, to provide the tablet 12 with the random, the SE 16 sends 228, only if the provided user authentication data matches the reference user authentication data, to the tablet 12, the random.

According to a second embodiment (not represented), to provide the tablet 12 with the random, the SE 16 presents or exposes, e.g., through the phone 14 MMI, to the verifier 11, the random. The SE 16 may further present the (provided) facial user picture(s), as user authentication data, and/or the user portrait, as the reference user authentication data to the verifier 11. Additionally, the tablet 12 may present or expose, e.g., through the tablet 12 MMI, to the verifier 11, the stored (or reference) random.

According to the first embodiment, once the tablet 12 has, in a preferred manner, verified that the (received) random is signed by the SE 16, the tablet 12 verifies 230 whether the received random does or does not match the stored (or reference) random. To verify whether the received random does or does not match the reference random, the tablet 12 compares the received random to the reference random.

If the received random does not match the reference random, then the tablet 12 does not authenticate 232 the driver's license, as user data. The user data may have been transferred to or cloned by an attacker who attempts to impersonate its genuine holder.

Otherwise, i.e. if the received random matches the reference random, the tablet 12 authenticates 234 the driver's license, as user data, i.e. recognizes that the user data belongs to the user 13. The user data is thus bounded or linked to the user 13.

According to the second embodiment, the verifier 11 verifies whether the random presented by the SE 16, e.g. through the phone MMI (or displayed through the phone 14) does or does not match the stored (or reference) random presented by the tablet 12 through the tablet 12 MMI (or displayed through the tablet 12). To verify whether the received random does or does not match the reference random, the tablet 12 compares the received random to the reference random. If the received random does not match the reference random, then the tablet 12 does not authenticate the driver's license, as user data. Otherwise, i.e. if the received random matches the reference random, the tablet 12 authenticates the driver's license. The user 13 is thus its genuine holder.

As a variant (not represented), once the SE 16 has carried out the user authentication step 226, the SE 16 generates either a user data authentication failure or a user data authentication success, as a user data authentication result. Then, the SE 16 sends, to the tablet 12, a signed user data authentication result. The tablet 12 sends, to the server 110, the signed user data authentication result. The server 110 verifies whether the signed user data authentication result is or is not valid, as a signature verification result that may be further signed. The server 110 sends, to the tablet 12, the signature verification result that may be previously signed by the server 110. After a possible successful verification that the signature verification result is signed by the server 110, the tablet 12 verifies whether the signature verification result is or is not valid. The tablet 12 or the verifier 11 verifies, only if the signature verification result is valid, i.e. the signed user authentication result is a user data authentication success signed by the SE 16, whether the provided random does or does not match the reference random. And the tablet 12 or the verifier 11 authenticates, only if the provided random matches the reference random of the user data, the user data.

After the tablet 12 has carried out the comparison of the received random with the reference random, the tablet 12 may display or present (not represented), through the tablet MMI, a message including the user data authentication result, namely either a user data authentication failure, such as "NOK", a user data authentication success, such as "OK".

The tablet 12 may send (not represented) to the server 110 a message including the user data authentication result that may have been previously signed by the tablet 12.

Once the user data has been successfully authenticated, the tablet holder 11 authorizes the user 13 to gain access to one or several associated road networks and/or one or several resources, i.e. a data piece(s) and/or a service(s).

The user data authentication does not have any risk since the user data authentication is preferably randomized and is preferably valid only once for each corresponding user data authentication request, i.e. for each user data authentication session.

The invention solution may also solve a user data revocation issue by blocking, at the server side, the associated second cryptogram, i.e. by not issuing any second cryptogram. The verifier device does not validate that the user data belongs to the user who claims to own the user data.

The invention solution allows authenticating user data without needing to disclose any personal user data to a verifier or a verifier device while giving to this latter the assurance that the user data effectively belongs to the concerned user.

The verifier and the verifier device have preferably therefore no knowledge of the concerned authenticated user data during the user data authentication session.

The invention solution allows authenticating, simply, securely and efficiently, user data to the verifier or the verifier device that does not need to be provisioned with neither any personal user data nor any cryptographic key.

The invention solution allows a verifier to use a single device, as a verifier device, to authenticate data relating to a plurality of users in an individual, separate and secure manner while preserving user privacy.

The invention solution may be used for authenticating a user ID or the like, as user data.

The invention claimed is:

1. A method for authenticating user data while preserving user privacy such that a verifier device does not need to access any personal user data, comprising:
   a) receiving, by a user device, from the verifier device, a request for getting the user data;
   b) retrieving, by the user device, a predetermined first cryptogram and a predetermined decryption key, wherein the first cryptogram is received by the user device from a server side during a registration or enrolment phase, wherein the first cryptogram does not contain any reference user data that can link the first cryptogram with a user by the verifier device;
   c) sending, from the user device to the verifier device, the first cryptogram, wherein the verifier device verifies that the first cryptogram has been previously signed by the server as the original and genuine sender, wherein the first cryptogram is used for launching, in an anonymous manner, a user authentication;
   d) sending, from the verifier device to a server, the first cryptogram;
   e) retrieving, by the server, based on the first cryptogram, a predetermined second cryptogram and a pre-generated random, wherein the random is pre-generated by the server, the second cryptogram being generated using a predetermined encryption key and predetermined reference user authentication data concatenated with the random;
   f) sending, from the server to the verifier device, the second cryptogram and the random;
   g) storing, by the verifier device, at least temporarily, the random, as a reference random;
   h) sending, from the verifier device to the user device, the second cryptogram;
   i) decrypting, by or through the user device, the second cryptogram using the decryption key;
   j) extracting, by or through the user device, the reference user authentication data and the random;
   k) providing, by the user, the user device with a provided user authentication data;
   l) verifying, by the user device, whether the provided user authentication data does or does not match the reference user authentication data;
   m) providing, only if the provided user authentication data matches the reference user authentication data, by the user device, the verifier device or a verifier, with the random;
   n) verifying, by the verifier device or the verifier, whether the random does or does not match the reference random; and
   o) authenticating, only if the random matches the reference random, by the verifier device or the verifier, the user data.

2. Method according to claim 1, wherein, the step m) consists in that, only if the provided user authentication data matches the reference user authentication data the user device sends, to the verifier device, the random, the step n) consists in that the verifier device verifies whether the random does or does not match the reference random, and the step o) consists in that the verifier device authenticates, only if the random matches the reference random, the user data.

3. Method according to claim 1, wherein, the step m) consists in that, only if the provided user authentication data matches the reference user authentication data, the user device presents to the verifier the random, the method further comprises a step m') of providing, from the verifier device to the verifier, the reference random that consists in that the verifier device presents to the verifier the reference random, the step n) consists in that the verifier verifies whether the random presented by the user device does or does not match the reference random presented by the verifier device and the step o) consists in that the verifier authenticates, only if the random presented by the user device matches the reference random presented by the verifier device, the user data.

4. Method according to claim 1, wherein, the second cryptogram including, besides encrypted reference user authentication data and an encrypted random, at least one encrypted predetermined user guiding instruction, the method further comprises, prior to carrying out the step k) of providing, by the user, the user device, with the provided user authentication data, a step in which the user device extracts, from the decrypted cryptogram, the at least one user guiding instruction and provides the user with the at least one user guiding instruction.

5. Method according to claim 1, wherein the method further comprises, after a first cryptogram generation step, a server cryptogram signature step in which the server signs the first cryptogram, and, prior to the step e) of retrieving, by the server, based on the first cryptogram, the second cryptogram and the random, a server cryptogram signature verification step in which the server verifies successfully that the first cryptogram is signed by the server.

6. Method according to claim 1, wherein the method further comprises, prior to the step f) of sending the second cryptogram and the random, a server random signature step in which the server signs at least the random and, prior to the step g) of storing the random, a server random signature verification step in which the verifier device verifies successfully that at least the random is signed by the server.

7. Method according to claim 1, wherein, after the step I) and instead of the steps m) to o), the method comprises the following steps:

generating, by the user device, a user data authentication failure or success, as a user data authentication result;

sending, by the user device, to the verifier device, a signed user data authentication result;

sending, by the verifier device, to the server, the signed user data authentication result;

verifying, by the server, whether the signed user data authentication result is or is not valid, as a signature verification result;

sending, by the server, to the verifier device, the signature verification result;

verifying, by the verifier device, whether the signature verification result is or is not valid;

verifying, by the verifier device or the verifier, only if the signature verification result is valid, whether a provided random does or does not match the reference random; and authenticating, by the verifier device or the verifier, only if the provided random matches the reference random of the user data, the user data.

8. Method according to claim 1, wherein the user device cooperates with a secure element that carries out at least one of the steps carried out by the user device.

9. Method according to claim 1, wherein the user data includes at least one element of the following group:

at least one piece of information relating to the user;

at least one biometric feature relating to the user; and at least one piece of information relating to a way of authenticating the user or user data.

10. A user device for authenticating user data while preserving user privacy such that a verifier device does not need to access any personal user data, the user device is configured to:

receive, from the verifier device, a request for getting the user data;

retrieve a predetermined first cryptogram and a predetermined decryption key, wherein the first cryptogram is received by the user device from a server side during a registration or enrolment phase, wherein the first cryptogram does not contain any reference user data that can link the first cryptogram with a user by the verifier device;

send, to the verifier device, the first cryptogram, wherein the verifier device verifies that the first cryptogram has been previously signed by the server as the original and genuine sender, wherein the first cryptogram is used for launching, in an anonymous manner, a user data authentication;

receive, from the verifier device, a second cryptogram;

decrypt the second cryptogram using the decryption key;

extract reference user authentication data and a random, wherein the random is pre-generated by the server;

be provided, by the user, with a provided user authentication data;

verify whether the provided user authentication data does or does not match the reference user authentication data; and provide, only if the provided user authentication data matches the reference user authentication data, the verifier device or a verifier, with the random.

11. A verifier device for authenticating user data while preserving user privacy such that the verifier device does not need to access any personal user data, the verifier device is configured to:

send, to a user device, a request for getting the user data;

receive, from the user device, a first cryptogram, wherein the first cryptogram is received by the user device from a server side during a registration or enrolment phase, wherein the first cryptogram does not contain any reference user data that can link the first cryptogram with a user by the verifier device;

verifying, by the verifier device, that the first cryptogram has been previously signed by the server as the original and genuine sender, wherein the first cryptogram is used for launching, in an anonymous manner a user data authentication;

send, to a server, the first cryptogram;

receive, from the server, a second cryptogram and a random, wherein the random is pre-generated by the server;

store, at least temporarily, the random, as a reference random; and send, to the user device, the second cryptogram.

* * * * *